United States Patent [19]

Rogers et al.

[11] Patent Number: 4,762,657

[45] Date of Patent: Aug. 9, 1988

[54] FORMATION OF POROUS MEMBRANES BY MECHANICAL DEFORMATION

[75] Inventors: Charles E. Rogers, Chagrin Falls; Zhong-He Shen, Cleveland, both of Ohio

[73] Assignee: The Dow Chemical Company, Midland, Mich.

[21] Appl. No.: 808,148

[22] Filed: Dec. 12, 1985

[51] Int. Cl.$^4$ .................. B28B 11/00; B29C 67/20; B29C 71/00

[52] U.S. Cl. ....................... 264/83; 264/154; 264/232; 264/235; 264/288.8; 264/DIG. 47

[58] Field of Search ............ 428/315.5, 315.7, 315.9, 428/910; 156/77; 264/154, 288.8; 210/638, 640; 264/83, 232, 235, DIG. 47

[56] References Cited

U.S. PATENT DOCUMENTS

| | | | |
|---|---|---|---|
| 2,951,305 | 9/1960 | Seymour | 41/39 |
| 3,384,531 | 5/1968 | Parrish | 428/315.5 |
| 3,426,754 | 2/1969 | Bierenbaum et al. | 428/315.5 |
| 3,471,604 | 10/1969 | Butcher | 264/156 |
| 3,750,735 | 8/1973 | Chiang et al. | 210/640 |
| 3,801,404 | 4/1974 | Druin et al. | 264/288.8 |
| 3,810,814 | 5/1974 | Herrick et al. | 428/310.5 |
| 3,922,432 | 11/1975 | Renn | 428/327 |
| 3,995,007 | 11/1976 | Nakamura et al. | 264/288.8 |
| 4,059,659 | 11/1977 | Hilterhaus | 428/315.5 |
| 4,097,383 | 6/1978 | Ohtani et al. | 428/310.5 |
| 4,148,734 | 4/1979 | Hilterhaus et al. | 264/48 |
| 4,207,182 | 6/1980 | Marze | 428/315.5 |
| 4,265,959 | 5/1981 | Sano et al. | 428/315.7 |
| 4,384,023 | 5/1983 | Okamura et al. | 428/910 |
| 4,588,633 | 5/1986 | Kono et al. | 428/315.5 |
| 4,629,650 | 12/1986 | Kataoka | 264/288.8 |

OTHER PUBLICATIONS

"Methods of Studying Crazing", Methods of Experimental Physics, (Academic Press 1980), vol. 16C, pp. 233-272.

Primary Examiner—William J. Van Balen

[57] ABSTRACT

This invention relates to a method for producing large area, controlled, uniform deformation of polymeric films which retards premature fracturing. The method includes a deformation step. Sulfonating and annealing the sulfonated deformed film are optional treatments of the method. Deformation can be achieved using pressing, peeling or rolling techniques. The deformed film is sulfonated utilizing sulfuric acid or fuming sulfuric acid.

The product obtained using the inventive method results in a deformed film which has improved flow and entrance pressure characteristics compared to non-deformed film materials. The product can be used as a microfiltration membrane, ultrafiltration membrane or filter for various gas, vapor or liquid mixtures. The film may also serve as a porous substrate or other media for other types of fluid separation or purification.

42 Claims, 6 Drawing Sheets

FIG. 1
DEPENDENCE OF EXTENSION OF DEFORMED SAMPLES AS A FUNCTION OF COMPRESSION RATIO $\lambda$ OF SANDWICH MATERIALS

× POLYETHYLENE FOAM
○ SOFT RUBBER
△ HARD RUBBER

FIG. 2
FLOW RATE VS. PRESSURE

FIG. 3
RATIO OF FLUX
FOR SULFO-
NATED AND
UNSULFONATED
POROUS SAMPLE
VERSUS PRESSURE

FIG. 4A
SULFORATION-SWELLING-
MICROCRAZE MODEL

FIG. 4B
ORIGINAL CRAZE

FIG. 4C
AFTER SULFORATION

FIG. 4D ——— CRAZE
         ━━━ SULFORMATION

FIG. 4E ——— CRAZE
         ━━━ SULFORMATION

FIG. 4F ——— CRAZE
         ━━━ SULFORMATION

FIG. 5
FLUX VERSUS PRESSURE

FIG. 6
FLUX VERSUS PRESSURE FOR DIFFERENT TIMES OF ANNEALING OF UNSULFONATED FILM

FIG. 7
FLUX VERSUS PRESSURE FOR CELGARD FILM

FIG. 8
THE EFFLUENT-FLUX-VS-PRESSURE CURVE OF HEAVILY ROLLED HDPE MEMBRANE (RUBBER SANDWICHED)

FIG. 9
THE EFFLUENT-FLUX-VS-PRESSURE CURVE OF
HEAVILY ROLLED HDPE MEMBRANE AFTER HEATING
AT 80°C FOR 0.5 HOURS

FIG. 10
THE EFFLUENT-FLUX-VS-PRESSURE CURVE OF LIGHTLY ROLLED
HDPE MEMBRANE (RUBBER SANDWICHED)

FIG. 11

THE EFFLUENT-FLUX-VS-PRESSURE CURVE OF LIGHTLY ROLLED HDPE MEMBRANE AFTER ONE MONTH AND HEATED AT 80°C FOR 0.5 HOURS

FORMATION OF POROUS MEMBRANES BY MECHANICAL DEFORMATION

DESCRIPTION

1. Technical Field

This invention relates to the formation of thin film polymer membranes which possess a microporous structure as a result of mechanical deformation, in the absence or presence of an enhancing fluid. The invention also relates to subsequent physical or chemical modification, such as sulfonation, of the microporous membrane to enhance its properties.

2. Background

Mechanical deformation of polymeric materials often leads to the formation of defect structures which have been identified, variously, as crazes, voids, shearbands, cracks, fractures, etc. Crazes, as opposed to fracture, can sustain a limited amount of load without formation of further structural defects. Crazes are typically about 1 micrometer thick. Their internal structure involves oriented fibrils which are about 200 Angstroms thick, with most fibrils oriented in the direction of tensile stress, and pores with a porosity (volume percent of polymeric material) that may range from about 30-90% by volume of the polymeric material, with typical values of 40-60%. The crazes are generally perpendicular to the maximum tensile stress. See generally, N. Brown, *Methods of Studying Crazing*, Methods of Experimental Physics, Vol. 16C, p. 263 (Academic Press 1980), hereby incorporated by reference.

Crazing can be produced by mechanical deformation in both amorphous glassy polymers and semicrystalline polymers. Crazing also can be produced in certain of these polymers by exposure to certain solvent and/or surface-active fluids, especially when the polymer is under mechanical stress.

Studies of the effects of mechanical deformation, in the absence or presence of solvent and/or surface-active fluids, leading to formation of various defect structures include observations of bulk polymers and thin films. However, these observations generally have been directed to non-localized formation of crazes or other defect structures. Non-localized mechanical deformation generally leads to the development of a non-uniform defect structure via formation, variously, of crazes, shearbands, voids, cracks or other defect structures. Sufficient continued deformation generally leads to crack formation, fracture, or other gross mechanical failure of the polymer. The perspective of observation has been that the formation of such non-uniform defect structures is detrimental to polymer membrane properties, such as mass transfer characteristics.

The present invention relates to artificial, localized formation of a microporous structure in a polymer film as a desirable characteristic. This deformation enhances characteristics of the polymer film. Improvement of film characteristics is achieved using localized deformation for formation of a more uniform wide-area microporous structure, without formation of gross cracks, fractures, or other gross defects detrimental to polymer characteristics. The microporous film subsequently may be chemically modified, for example, by sulfonation, to alter its chemical characteristics and its microporous structure. The microporous film, chemically modified or not, subsequently also may be modified physically to alter and/or stabilize its structure and characteristics. Thus, the invention utilizes that which was considered to be a disadvantage in thin film technology and utilizes that which was discouraged in the prior art to improve mass transfer and related characteristics of thin films.

It is known in the art to abrade a polymer film while passing it between rollers. For example, U.S. Pat. No. 3,471,604 teaches a film passed between rollers which is either indented or perforated by the rollers. Similarly, U.S. Pat. No. 3,922,432 teaches a thin layer medium which is grooved or cut on its surface to expose a portion of the surface of the medium. U.S. Pat. No. 4,148,734 relates to a filter material in which surface area of the structure is abraded more or less depending upon desired pore size. According to this patent, abrasion is achieved using a wet grinding technique. U.S. Pat. No. 2,951,305 also relates to a mechanical abrasion technique for film surfaces. In this patent, a film is passed between a rotating brush having, for example, crimp steel bristles, located above a backing roll.

These abrasive mechanical treatments are not desirable in obtaining improved thin, semicrystalline or glassy polymer film membranes, according to the present invention.

SUMMARY OF THE INVENTION

This invention relates to methods for producing large area, controlled uniform porosities in polymeric membranes without premature fracturing or other gross defect formation. The method includes a mechanical deformation step with the option of a subsequent chemical modification step. The porous membrane material, chemically modified or not, subsequently may be physically modified to alter and/or stabilize its structure and characteristics. The product obtained using the inventive procedure of the present invention achieves membrane materials which have improved mass transfer characteristics.

The invention relates to a method for preparing polymer film membranes, comprising:

(a) forming a polymer film membrane having a high surface-to-volume ratio from a homopolymer, copolymer, block copolymer or a polyblend material; and (b) deforming the polymer film membrane to form a porous film membrane having a high concentration of porous regions per area of matrix;

whereby fluid flow rate being substantially increased compared to nonporous film membranes.

This invention also relates to a method for preparing glassy polymer, thin film membranes having controlled wide area deforming, comprising:

(a) forming a glassy polymer film membrane having a high surface-to-volume ratio from a homopolymer, copolymer, block copolymer or a polyblend material; and (b) deforming the glassy polymer film membrane to form a porous film membrane having a high concentration of porous regions per area of matrix;

whereby fluid flow rate being substantially increased compared to nonporous film membranes.

This invention also relates to a method for preparing thin polymer film membranes having controlled wide area deforming, comprising:

(a) forming a thin polymer film membrane having a high surface-to-volume ratio from a glassy polymer, styrene butadiene block copolymer, polyblends of polystyrene or semicrystalline polymer;

(b) deforming the glassy polymer film membrane to form a porous film membrane having a high concentration of porous regions per area of matrix; and (c) sulfonating the thin, porous polymer film membrane using a solid-fluid heterogenous reaction;

whereby fluid flow rate being substantially increased and entrance pressure being reduced compared to nonporous, thin film membranes.

This invention also relates to a method for preparing thin polymer film membranes having controlled wide area deforming, comprising:

(a) forming a thin polymer film membrane having a high surface-to-volume ratio from glassy polymers, styrene butadiene block copolymer, polyblends of polystyrene or semicrystalline polymer;

(b) deforming the glassy polymer film membrane to form a porous film membrane having a high concentration of porous regions per area of matrix;

(c) sulfonating the thin, porous polymer film membrane using a solid-fuel heterogeneous reaction; and (d) annealing the sulfonated deformed film membrane;

whereby fluid flow rate being substantially increased compared to nonporous, thin film membranes.

This invention also relates to a thin polymer film membrane comprising a thin, deformed polymer film membrane of a homopolymer, copolymer, block copolymer or polyblend material, the polymer film membrane having substantially uniform porosity and a high concentration of porosity per area of matrix, whereby fluid flow rate being substantially increased compared to nonporous, thin film membranes.

This invention also relates to a thin polymer film membrane comprising a thin polymer sulfonated film membrane of glassy polymers, styrene butadiene, block copolymers, polyblends of polystyrene or semicrystalline polymers, the polymer film membrane having a high concentration of porosity per area of matrix and having a thickness between about 0.1 to about 10 mils, preferably from about 1 to about 3 mils, whereby fluid flow rate being substantially increased and entrance pressure being reduced compared to a nonporous, thin film membrane.

This invention also relates to a thin polymer film membrane comprising a thin polymer sulfonated, annealed film membrane of glassy polymers, styrene butadiene, block copolymers, polyblends of polystyrene, or semicrystalline polymers, the polymer film membrane having a high concentration of porosity per area of matrix and having a thickness between about 0.1 to about 10 mils, preferably from about 1 to about 3 mils, whereby fluid flow rate being substantially increased and entrance pressure being reduced compared to a nonporous, thin film membrane.

DISCLOSURE OF INVENTION

This invention relates to a method for producing porous and chemically modified porous or nonporous polymeric membranes. These membranes can be used as separation membranes, microfiltration membranes, ultrafiltration membranes or filters for various gas, vapor or liquid mixtures. The membranes may also serve as a porous substrate or other media for other types of fluid separation or purification. Actual fracture of such membranes is significantly inhibited.

Porosity formation is the result of controlled defect formation by mechanical deformation of the polymer film membrane. The defects may include, but not be limited to, variously, crazes shearbands, voids or microcracks. Formation of gross cracks, fractures or other gross defects is significantly inhibited. The porous structure is not that obtained by abrasion.

The term "porous" is used to indicate that the material is full of pores (tiny openings or holes into and/or through the film) which allow the film to be permeable to liquids and/or sorption liquids. An applied pressure may or may not be needed to overcome entrance pressure, related to the relative surface tensions of the liquid and the film and the diameter of the pores, to allow the liquid to enter the pores. The pores may be nearly spherical in radial cross-section, or they may be elongated or of other shape, depending on the material properties and the method and conditions of deformation. They may form an essentially continuous path through the thickness of the film, or part way through from one side or both sides, again depending on the material properties and the method and conditions of deformation.

A "non-porous" membrane is characterized by a lack of a substantial population of pores, as described above relating to a definition of a "porous" membrane. Non-porous membranes do not display a significant permeability and/or sorption of liquids comparable to that displayed by a porous membrane. A non-porous membrane will display a permeability to such liquids, but the magnitude of the permeability, compared to that of a porous membrane of the same material, will be characteristic of an activated solution-diffusion process which is generally lower in magnitude than a truly "porous" transport process. The porous transport process and the activated transport process generally display different dependencies on applied pressure and other experimental variables and conditions which permit some differentiation between occurrence of the processes in a given membrane system. It is to be noted that a membrane with a structure that is almost totally non-porous over its area may have a few scattered gross defects (for example, cracks, pinholes, etc.) that led to an overwhelming contribution of a gross porous-type flow, in addition to the solution-diffusion flow through the nonporous membrane area. Such a film is not to be considered as "porous".

Formation of Porous Structure

The method includes a mechanical deformation step. The formation of the porous structure can be achieved utilizing press deformation, peel deformation and roll deformation in the absence or presence of a solvent or surface-active fluid. Press deformation involves pressing a polymer between rubber or polymer-foam sheets. Peel deformation involves peeling off a polymeric film adhered to an adhesive substrate. Roll deformation is a continuous operation, as opposed to the foregoing batch operations. Roll deformation is accomplished by moving a polymeric film between rollers having yieldable surfaces. The surface material can be rubber or a polymer foam. Each of the deformation mechanisms is directed to localized deformation of a polymer.

The inventive method successfully inhibits premature fracture of thin polymeric film membranes.

A criterium for producing large area porosity is that a force must be imposed on the sample locally ("inch-by-inch"), rather than on the whole area of the sample at once. If the imposed time of the deformation is short for the local areas, the crack propagation may be controlled to allow formation of only large area porosity without premature fracture.

In the press and rolling methods, the deformation of the elastomer or polymer foam under pressure produces localized dilational deformation of the sample, leading to formation of a porous structure. Propagation of craze or other defect growth, leading to crack formation and fracture, is retarded under proper conditions of temperature, pressure and deformation rate determinable by those skilled in the art. In the peeling method, the localized dilation deformation is achieved by bending the sample at approximately right angles, that is, by locally tensing or stretching the sample, during the peeling process.

The term "dilational deformation" refers to a deformation of a material which results in, or tends to favor or promote, an increase of volume of the material under the applied stress field. A positive tensile deformation (that is, stretching the material) is the more vivid example of such a deformation. The effects of dilational deformation usually are more obvious for materials with a Poisson Ratio less than one-half. The effects are apparent for polymeric materials, generally in the glassy or semi-crystalline state, in which the imposition of a dilational deformation condition leads to the formation of crazes, microcracks, voids, etc., resulting in an increase in the overall volume occupied by the polymer sample.

Thus, press deformation can be achieved by pressing a sample between two rubber sheets. Peel deformation can be acheived by peeling off a sample adhered to adhesive substrate. Roll deformation can be achieved by rolling (calendaring) a sample between two rubber or polymer foam sheets or rollers. These techniques are exemplary and not exclusive.

A range of elastomeric materials may be used in the press and rolling methods to sandwich the polymeric film to be deformed. Likewise, a range of adhesive substrates are suitable for the peeling method, depending on the extent of adhesion required for a given polymeric film.

Press Deformation Method

In the press deformation method, room temperature is suitable to achieve the formation of a porous structure. Other temperatures may be favorable, depending upon the glass transition temperature of the polymer and the dependence of porosity formation on temperature. Pressure in the range of about 50 kilograms per square centimeter to about 200 kilograms per square centimeter are suitable. Other pressures may also be suitable, depending upon the polymer used to form the thin film membrane. Higher pressures, for example, of about 500 kilograms per square centimeter, can cause cracking. The duration of the pressure application is nominally about one minute. The press deformation method is relatively insensitive to time under pressure at constant pressure.

A typical thin film thickness is on the order of about 2 mils. Thinner or thicker films may be deformed to develop porosity. Very thick films of greater than about 10 mils will generally not form a porous structure. Very thin films of about less than 0.1 mils can develop cracks.

Peel Deformation Method

In the peel deformation method, room temperature is an adequate temperature at which to perform this deformation technique. Other temperatures may also be favorable. Membrane thickness must be thin enough to allow unpeeling with bending of a sample so as to impose localized dilational deformation on the sample, leading to craze formation of a porous structure. Very thin membranes do not have cohesive strength to withstand the tensile force required to peel the sample off a substrate, and so the sample tears or rips. Thick samples do not bend sufficiently to cause porosity formation. Rate of peeling is in the range of about 3 to about 0.1 inches per second. Slower rates are possible, but are generally unproductive. Faster rates are difficult to control and lead to tearing of a membrane. Of course, use of automatic peeling devices would tend to extend this range.

Roll Deformation Method

In the roll deformation method, room temperature is also an adequate temperature to perform this technique. Again, other temperatures may be favorable. Membrane thickness is nominally 1 to 3 mils. Thick samples of about greater than 10 mils will generally not give a porous structure. Thin samples of less than about 0.5 mils will generally develop cracks. The sandwiching material must be elastomeric. Suitable materials include, but are not limited to, soft rubber, hard rubber and polyethylene foam. The use of other hardness film material leads to rugged and abraded material surfaces, but does not produce uniform large area porosity. An example of a medium hardness film material is polystyrene. An example of a high hardness film material is aluminum foil. Use of filter paper serves to protect the surface, but inhibits formation of porous structure. The deformation of low hardness polyethylene under rolling pressures is insufficient to produce crazing in the film material. Applied pressure depends upon the film material, and the rate of rolling is nominally 1 to 3 inches per second.

It is found to be advantageous to expose some membranes (for example, polyethylene) to a surface-active agent (for example, a biodegradable, non-ionic surfactant, such as IGEPAL) during the rolling deformation process. This is conveniently performed by soaking the polyethylene foam in the agent before rolling the sandwich assembly. Such surface-active agents are known to promote defect formation during deformation of certain polymers.

The three processes or techniques described above can produce polymeric material with controlled uniform, large area porosity for use as, or intermediate materials for, separation membranes, barrier polymers, and other uses.

The membrane has a minimum thickness, such that it has essentially no pinholes or other leakages therein. However, the rate at which fluid permeates the membranes of this invention is related to the thickness of the membrane. Accordingly, it is preferred to prepare a membrane as thin as possible in order to maximize the permeation rate, while ensuring the integrity of the membrane.

As pointed out above, polymers useful in the present invention include homopolymers (for example, glassy polymers such as biaxially oriented polystyrene like that known as TRYCITE film (trademark of the Dow Chemical Company), polyacrylates, polyethylene terephthalate, polycarbonates), block copolymers (for example, KRO-1, styrene butadiene), and various polyblends (for example, a high impact polystyrene resin like that known as STYRON-brand HIPS, trademark of the Dow Chemical Company), all utilized below their glass transition temperatures. Semicrystalline polymers (for example, polyolefins or polyethylene, polytetrafluoroethylene,) are utilized below their melt temperatures. Included in these are: various polyolefins, such as polymers and copolymers of ethylene and propylene in high or low density versions and in generally linear or cross-linked forms; and polystyrene and other polymers and copolymers of various alkenyl aromatic monomers, such as styrene/acrylonitrile copolymers and ABS-type resins; vinyl chloride polymers and copolymers. Polypropylene is not useful in this invention.

The styrene polymers employed are generally polymers and copolymers of alkenyl aromatic monomers of the formula:

(I)

wherein G is selected from the group consisting of hydrogen and methyl and Ar is an aromatic radical, including various alkyl and halo-ring-substituted aromatic units of from 6 to 10 carbon atoms. Styrene (i.e., "St") is ordinarily the most advantageous and oftentimes preferred species of the formula (I) monomers to utilize. Others that are frequently quite satisfactory include: alpha-methyl styrene (i.e., "MeSt"); vinyl toluene (i.e., "VT"); vinyl naphthalene (i.e., "VNPth"); the dimethylstyrenes (i.e., "diMeSt's"), t-butyl styrene (i.e., "t-BuST"); the several chlorostyrenes (such as the mono- and dichloro-variants—i.e., "ClSt" and "diClSt"); the several bromostyrenes (such as the mono- and dibromo-variants—i.e., "BrSt" and "diBrSt"); and so forth.

Copolymeric styrene polymers can be copolymerizates of one or more formula (I) monomers, particularly St, with one (or even mixtures) of other addition-polymerizable monoethylenically unsaturated comonomers that are copolymerizable with St, including, by way of illustration and not limitation, acrylonitrile (i.e., "VCN") and methacrylonitrile; vinyl chloride (i.e., "VCl") and other vinyl halides; vinylidene chloride (i.e., "VeCl"); acrylic acid (i.e., "HAcr") and its addition-polymerizable esters; methacrylic acid (i.e., "HMeAcr") and its addition-polymerizable esters; various vinyl organic esters, such as vinyl acetate, vinyl propionate; etc; and so forth.

The styrene polymers utilized may also be the rubber-modified interpolymerized products of graftable preformed elastomers and monomers of formula (I). Typical of these are the so-called high impact polystyrenes. When use is made for the styrene polymers of rubber-modified, impact grade plastics products, it is customary for them to be prepared by incorporation in the composition of from, say, 1–20 wt % of an unsaturated, graft-copolymerizable stock of natural or synthetic rubbery elastomers for interpolymerization with the monoethylenically-unsaturated monomer in the reaction mass; all according to established procedures. The modifying rubber contains polybutadiene or a polybutadiene derivative; although, if desired, natural rubbers may be employed, as may styrene/butadiene polymers (as, for example, of the well-known "GRS"-type), polyether elastomers, etc.

It is of general good advantage when copolymeric styrene polymers are employed for at least about 60% by weight ("wt %"), based on copolymer weight, of formula (I) monomer(s) that are copolymerizable with St to be copolymerized in the polymer molecule. More advantageously, this is at least about 80 wt %, with the balance of copolymerized ingredients being desired comonomer(s) that are copolymerizable with St.

The block copolymers of the present invention are best described as impact-resistant polymers which have an ABA, (AB)$_n$X, or $(A—B)_{\overline{n}}$ arrangement of A (thermoplastic) and B (rubbery) blocks. The hard A blocks are glassy (e.g., polystyrene) or crystalline (e.g., polyester, polyurethane); the soft B blocks are elastomeric (e.g., polybutadiene, polyisoprene). When the hard segments are incompatible with the soft segments, the domains or regions of hard blocks act as reinforcing physical cross-links for the rubbery matrix. In contrast to chemically cross-linked rubbers, the physical network is thermally reversible. When the polymer is heated above the glass transition temperature of the hard block, the hard blocks soften and allow the rubber to flow and to be processed as a thermoplastic.

The manufacture of block copolymer thermoplastic elastomers depends upon the type and arrangement of the blocks. For example, styrene-butadiene ABA and (AB)$_n$X block copolymers are conveniently prepared by alkyllithium initiated anionic polymerization. Thermoplastic $(A—B)_{\overline{n}}$ polyurethanes are synthesized by step-growth addition copolymerization of dihydroxy compounds, such as polytetramethylene ether glycol and toluene diisocyanate. The copolyester-ether $(A—B)_{\overline{n}}$ copolymers are produced by the polycondensation of dicarboxylic acids (e.g., terephthalic acid) with glycols or polyether glycols. The preferred block copolymers of the present invention are those made from styrene-diene comonomers having a block arrangement of ABA or (AB)$_n$X.

A significant group of polymers to which this invention may be applied are the olefin polymers, for example, polyethylene, poly-3-methyl butene-1, poly-4-methyl pentene-1, as well as copolymers of 3-methyl butene-1, 4-methyl pentene-1, or ethylene with each other or with minor amounts of other olefins, for example, copolymers of a major amount of 3-methyl butene-1 and a minor amount of a straight chain n-alkene, such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1.

Film can be formed from the preceding materials by conventional methods including coating and extruding as well as blowing film. See W. Park, *Plastics Film Technology*, (Krieger Publishing Co., 1969), hereby incorporated by reference. Conventional processing conditions are also utilized.

Large area mechanically deformed membrane materials produced according to the above techniques may be used, as deformed with suitable porous structure stabilization, as membranes for separations, microfiltration, ultrafiltration or filtration, depending upon the effective porosity of the material. Surface porous membranes with a residual nonporous core layer may be used as separation membranes and/or barrier membranes.

Porous membranes may be used as intermediate materials for further physical and/or chemical modification to enhance their separation and/or barrier properties. The porosity of the modified and unmodified porous materials can be changed by annealing under a controlled deformation state. The porous and structurally stabilized material may serve as a sorptive media for extraction, printing or related uses. Chemically annealed initially chemically modified porous membranes are nonporous (negligible liquid flow), but may be used as separation membranes operative by nonporous transport mechanisms (for example, solution-diffusion or ion-migration transport mechanisms). Such membranes have continuous nonporous domains of the chemically modified initially porous structure from one surface to the other surface of the annealed membrane. These domains would provide diffusive pathways through the membrane. The surrounding matrix would provide mechanical support and cohesive strength to the domain structure. This utility may or may not require an appropriate chemical treatment, depending upon the nature of the end use sorbed species relative to the physiochemical nature of the porous polymeric material. Two such modification techniques are described below.

Modifications

As mentioned above, porous membranes may be physically and/or chemically modified to enhance their separation and/or barrier properties. Two such modification techniques are sulfonation and annealing.

In concept, any controllable chemical reaction which results in the placement of a desired chemical group on the membrane structure, without successive swelling or other disruption of the porous structure, could be used for chemical modification of the porous polymer film membrane. The choice of the reaction would depend on the chemical nature of the membrane structure and the desired modified membrane structural composition relative to the physiochemical nature of the intended en-duse application of the polymer film membrane.

Sulfonation

Because porous film is somewhat more reactive than undeformed matrix, due to its high surface/volume ratio and perhaps to residual stress/strain, it is possible to prepare chemically modified matrix. Sulfonation is a type of chemical modification. Sulfonation is achieved, for example, by immersing a crazed film in 96–100% sulfuric acid at room temperature for various periods of time. Sulfonated film can be dyed with methylene blue and encapsulated with wax for observation of its structure.

In order to preserve porous structure, no solvent can be used to facilitate diffusion of sulfonation agent into the interior of the membrane. Thus, the reaction must be a solid-fluid heterogeneous reaction. The rate of reaction is controlled by liquid flow into the porous structure and by diffusion of the sulfonation agent into the polymer film. Various sulfonation media, for example, $SO_3$, fuming sulfuric acid and various concentrations of $H_2SO_4$ and the like, can be used. Sulfonation using 96–100% sulfuric acid is preferred.

Porous material is more easily sulfonated in proportion to porosity concentration. There is a linear relationship between porous area and sulfonation weight increase. Porous area is about 8 times faster in reaction than is nonporous area in KRO-1 styrene-butadiene copolymer samples.

Depth of sulfonation is related to the time for sulfonation. The relationship is that the boundary of the reaction is linearly proportional to time. This behavior is a consequence of diffusion with concurrent irreversible reaction. Sorbed and diffusing sulfuric acid reacts with polymer film to form a sulfonation layer which offers less resistance to penetration of sulfuric acid; that is, the diffusion rate of sulfuric acid in the sulfonated layer is greater than in the unreacted material, leading to an advancing-front type absorption behavior.

In the initial stage of reaction, the sulfonation weight increases linearly proportional to time, followed by an acceleration after about one-half of the sample is reacted. A porous film undergoes a more pronounced acceleration than does a nonporous film, because the effective thickness of the unreacted film is much less in the porous film than in the nonporous film. Because the porous film has a larger surface area than the nonporous film, the higher rate of reaction in the first stage in the porous film is understandable. Another probable cause of faster reaction rate in the porous film is that it swells more rapidly.

The process of sulfonation also leads to a further increase in effective porous structure. Sulfonation of a surface porous membrane with a nonporous core, initially impermeable to fluid flow, produced a membrane with a substantial increase in fluid flow comparable to that obtained by sulfonation of an initially porous membrane. A possible cause of this increase in porosity is the local stress incurred on the nonporous core due to the chemical reaction and swelling during the sulfuric acid treatment.

Regarding sorbed water content versus sulfonation weight increment, there is a pronounced increase at 20% sulfonation, whereas above 80% sulfonation the film swells extensively and is too weak to handle. Sulfonated films also swell in methanol, somewhat in toluene, but do not swell in hexane. The membranes become brittle with increasing sulfonation, but annealing greatly improves their toughness. Dyeing with methylene blue clearly shows a two-domain structure in the membrane; sulfonated, porous domains and unsulfonated, nonporous domains. The size and shape of the domain depends upon the deformation method. Because the initial deformation can be controlled, the concentration difference and geometry of ionic groups between porous and nonporous domains also can be controlled. Thus, the method of the present invention can be used to make membranes which have specific size and shape charged domains imbedded in an uncharged material matrix.

Ionic cluster channel size is a major factor determining sorption, transport and separation of different coions. The cluster size in those isomers is determined by fixed charged concentrations, chain sequence distributions and somewhat by external concentrations of electrolytic ions. In porous sulfonated films, the size of ionic domains is largely independent of those factors. The size, distribution and shape of the ionic domains are prescribed by the deformation and reaction procedures and are stabilized by the restraint of the surrounding unreacted glassy polymer matrix.

Roll deformed styrene butadiene films appear visually uniform in porosity density. Some of those films are permeable to water under one atmospheric pressure, while others are not. The flow rates of water are typically $8 \times 10^{-3}$ cm$^3$/min cm$^2$ to 0.5 cm$^3$/min cm$^2$.

BRIEF DESCRIPTION OF DRAWINGS

Features of the present invention will be described in connection with the accompanying figures, which are illustrative and not limiting, and which summarize the results of experimentation.

The following experiments illustrate the pressing, peeling and rolling deformation techniques and also illustrate the effect of sulfonation upon porous film, as well as the improved properties of the sulfonated porous film. These experiments are merely illustrative of preferred features and are not considered to limit the present invention.

EXPERIMENTS

Pressing Technique

This experiment uses a styrene butadiene copolymer identified as KRO-1. KRO-1 is a trade name for a styrene butadiene material supplied by the Phillips Petroleum Company. KRO-1 film of 0.7 mils thickness is pressed between rubber sheets under 222 lb/in² pressure. It is observed that the deformation regions developed into microcracks with the increasing time during the cyclic pressing operation. The sample is pressed 1 minute, then the pressure is released. Then, it is pressed 1 minute again. When time of pressing is accumulated to 5 minutes, microcracks appear. This is attributed to craze propagation with time and/or accumulation of other damage. When the film is pressed for 15 minutes, the flow rate without applying pressure is $6.6 \times 10^{-3}$ g/cm² min. At 10 psi, it increases to 1.1 g/cm² min. At 20 psi, it increases to 1.95 g/cm² min.

Peeling Technique

A KRO-1 film of 1.7 mils thickness is adhered to a conventional two-sided adhesive tape which is adhered to a steel plate. The film then is manually peeled off. Then, the other side of the peeled-off KRO-1 film is adhered to the adhesive tape and again peeled off. The appearance of the peeled film is densely silvery. The flow rate of water at 16 psi is $9 \times 10^{-4}$ g/cm² min, at 26 psi is $2.6 \times 10^{-3}$ g/cm² min, and at 32 psi is $5.3 \times 10^{-3}$ g/cm² min.

Rolling Technique

The rolling procedure uses a conventional motor-driven roller (Fenn Manufacturing Co.) with roller diameters of 10.5 inches, one revolution every six seconds. The force exerted on the sandwich sample is calculated in terms of the roller gap L, and the thickness of the sandwich sample $L_o$, as the compression ratio lambda $= L/L_o$. The compression modulus CM is equal to $(F/A)/(\delta L/L_o)$, where F is force (lbf), A is sample area (in²), delta L is thickness decrease and $L_o$ is original thickness of the sandwich sample.

Figure 1:
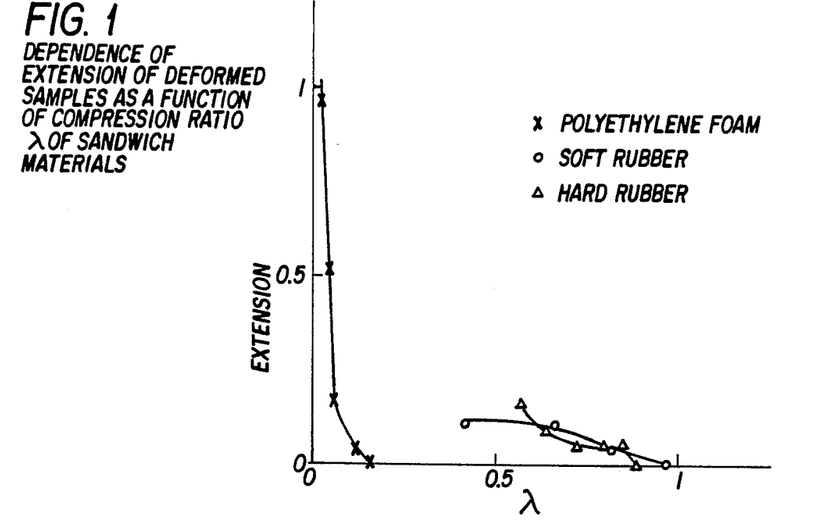
FIG. 1 shows the dependence of the extension of deformed samples as a function of the compression ratio lambda using polyethylene foam or soft or hard rubber as sandwiching materials.

The sandwiching materials are polyethylene foam (thickness 115 mils and CM 1170 lbf/in²), soft rubber (thickness 64 mils and CM 1640 lbf/in²), and hard rubber (thickness 118 mils and CM 3200 lbf/in²). Tables 1-3 give the relationships between compression ratio lambda, force, porosity and extension percentage (elongation of the rolled sample, as compared to initial length of the sample in the roll direction) for KRO-1 samples. It is noted that the polyethylene (PE) foam gives the greatest extension percentage for the least compression ratio, as shown graphically in FIG. 1, for which the data is presented in the following three Tables.

TABLE 1

The Relationship Between Compression Ratio, Force, Extension Percentage when PE Foam is Used as Sandwiching Materials for Deforming KRO-1 Film

| Lambda | (lbf/in²) | Extension % | Porosity |
|---|---|---|---|
| 0.165 | 70.6 | 0 | Not porous |
| 0.117 | 87.7 | 5 | Porous |
| 0.068 | 120.4 | 18 | Porous |
| 0.044 | 139.0 | 52 | Porous |
| 0.02 | 167.5 | 97 | Porous |

TABLE 2

The Relationships Between Compression Ratio, Force, Extension Percentage when Soft Rubber is Used as Sandwiching Materials for Deforming KRO-1 Film

| Lambda | (lbf/in²) | Extension % | Porosity |
|---|---|---|---|
| 0.968 | 78.5 | 0 | Slightly Porous |
| 0.825 | 138.7 | 4 | Porous |
| 0.745 | 282 | 6.4 | Porous |
| 0.666 | 479 | 10.2 | Porous |
| 0.428 | 1020 | 12.2 | Cracked |

TABLE 3

The Relationships Between Compression Ratio, Force, Extension Percentage when Hard Rubber is Used as Sandwiching Materials for Deforming KRO-1 Film

| Lambda | (lbf/in²) | Extension % | Porosity |
|---|---|---|---|
| 0.888 | 141 | 0 | Porous |
| 0.85 | 240 | 4.1 | Porous |
| 0.808 | 345 | 4 | Porous |
| 0.725 | 649 | 4 | Porous |
| 0.642 | 942 | 9 | Porous |
| 0.558 | 1200 | 16.2 | Cracked |

Glassy Membrane Material

The following experiments also utilize a styrene butadiene copolymer identified as KRO-1. The styrene butadiene film is cast on a glass plate from a 6-8% solution of toluene to give a film thickness of 1-2 mils after air and vacuum drying. The film is sandwiched between two sheets of white soft polyethylene foam (Fisher Scientific, 115 mils thick) or between black high modulus rubber and rolled in a manual roller or in a large engine-driven metallurgical roller. Thereafter, the porous films are immersed in a 96-100% sulfuric acid at room temperature for various periods of time. Water permeabilities are measured at room temperature using a Millipore cell with a filter area of 11.3 cm². The following results are obtained utilizing the sulfonated, porous styrene butadiene copolymer produced according to the experimental procedure just discussed.

Figure 2:
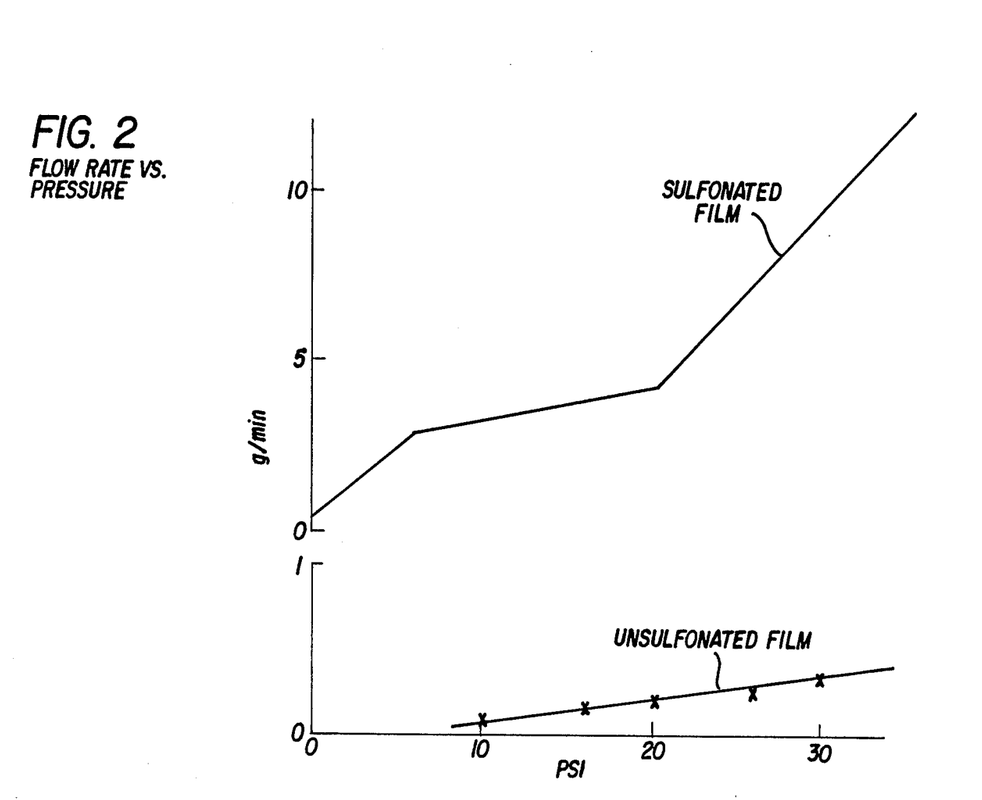
FIG. 2 shows flow rate versus pressure for sulfonated and unsulfonated films, where the film is 0.7 mils and sulfonation is 18%.

When porous styrene butadiene film is sulfonated, its water flow rate increases many times, as shown in FIG. 2 and Table 4.

TABLE 4

Flow Rate vs. Pressure

| Pressure, psi | Unsulfonated Flow Rate g, water/min | Sulfonated Flow Rate g, water/min |
|---|---|---|
| 0 | 0.08 | 0.54 |
| 6 | — | 2.7 |
| 10 | 0.08 | 3.4 |
| 16 | 0.15 | 4.6 |
| 20 | 0.19 | 5.2 |
| 26 | 0.26 | 7.22 |
| 30 | 0.34 | 11.05 |
| 36 | 0.45 | 12.8 |

Figure 3:
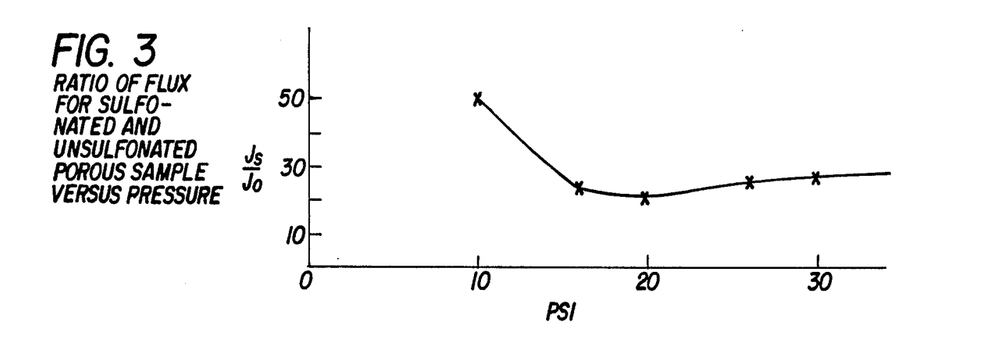
FIG. 3 shows ratio of flux for sulfonated and unsulfonated porous films versus pressure calculated from the data in FIG. 2.
Figure 4A:
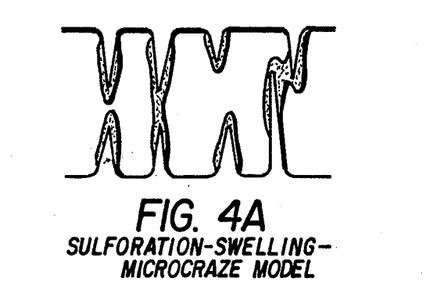
FIGS. 4A, 4B, 4C, 4D, 4E and 4F show that subsequent high swelling of contiguous sulfonated regions during initial exposure to water in the flux test also would produce further porosity through the unsulfonated layer.
Figure 4B:
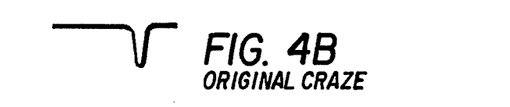
Figure 4C:
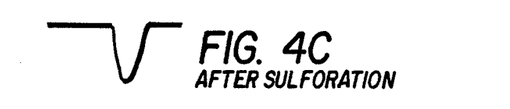
Figure 4D:
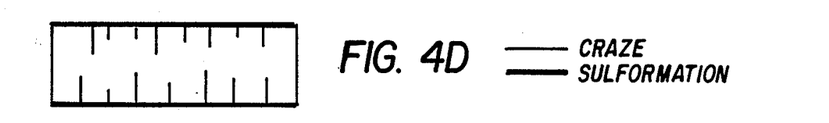
Figure 4E:
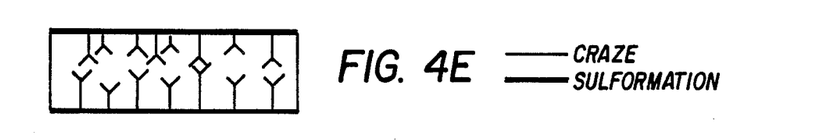
Figure 4F:
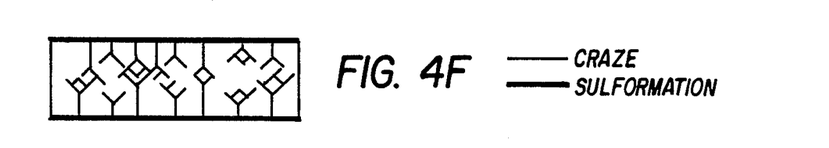

FIG. 3 and Table 5 show the results of experiments concerning the ratio of flow rates, after sulfonation as well as before sulfonation, versus pressure.

TABLE 5

Ratio of Flux for Sulfonated and Unsulfonated Porous Sample vs. Pressure

| Pressure, psi | Ratio |
|---|---|
| 0 | — |
| 6 | — |
| 10 | 53 |
| 16 | 24 |
| 20 | 20 |
| 26 | 25 |
| 30 | 27 |
| 36 | 28 |

These results show a very high difference in flow rates at low pressure, followed by a leveling off at higher pressures. This behavior can be understood considering a change in entrance pressure and the amount of water accommodated within a pore due to sulfonation.

Passage of water into and through a pore is governed by the attainment of a minimum pressure necessary to overcome capillary forces. The driving force for porous flow can be expressed as: delta $p=p-p_e$, where p is the applied pressure at the feed surface, with the pressure at the other surface taken as zero, and $p_e$ is the entrance pressure. This "entrance pressure" decreases as pore radius increses and as the difference between surface tension between the penetrant and the polymer film decreases. The entrance pressure for sulfonated polymer film is much less than for unsulfonated polymer film due to higher surface tension of the sulfonated water-wettable polymer film. The increase in flow rate in the sulfonated polymer film due to this effect alone is seen in FIG. 2, where there is a finite water flux at zero pressure through the sulfonated sample, whereas the unsulfonated sample has an entrance pressure of about 8 psi.

It appears that flux through the unsulfonated film is primarily porous flow following a Hagan-Poiseuille type of reaction:

$$J_o = (n(\pi)r^4/8(\text{eta}))(\text{delta } p/l)$$

where n is the number of pores per unit area of average radius r; eta is the viscosity, delta p is the pressure difference across the film; and l is the length of the poure taken as the film thickness. This type of equation would be applicable for delta p greater than the entrance pressure.

Flow through the sulfonated membrane can be considered as due to a porous flow component, plus an additional contribution by migration of water absorbed on the sulfonated pore walls:

$$J_s = J'_o + J_m$$

The porous flow component $J'_o$ may not be equal to $J_o$, because one would anticipate changes in n due to the formation of additional effective pores during the sulfonation reaction changes in r for the same reason, and an effective change in delta p for a given p due to the change in the entrance pressure $p_e$.

Considering the experimental data presented in FIG. 3, it appears that at low pressures the difference in entrance pressures gives a high relative flux through the sulfonated sample. At p less than $p_e$ for the unsulfonated sample, $J_s/J_o$ approaches infinity, because $J_o$ is zero. At pressures greater than the entrance pressure for the unsulfonated sample, the additional solution-diffusion contribution in the sulfonated sample increases with pressure, such that $J_s/J_o$ goes through a minimum, then increases slowly. An extrapolation of $J_s/J_o$ experimental data above 20 psi to zero pressure gives a linear relation with a flux intercept at about ten.

Some deformed styrene butadiene films are not permeable to water. This indicates that the porosity does not penetrate the whole film thickness or the porosity regions do not interconnect. In other words, between pores from each surface there is a nonporous layer. However, after sulfonation of these films, the flow rate increases greatly. It appears that entrance flow rate is due to sulfonation of the nonporous layer in the core of the film or the propagation of porosity through the initially nonporous course due to progressive sulfonation.

While we do not wish to be bound by the following postulated theory, it is presented as a means to explain the phenomenon discovered. Considering the flux increase effect along with acceleration phenomena during sulfonation, described above, gives a basis for a mechanism which can explain why the deformed, but not permeable, film can have a large flow rate after sulfonation. Because the extent of sulfonation is high in the porous regions, it causes a local stress during sulfonation, which further propagates the porous region. Subsequent high swelling of contiguous sulfonated regions during initial exposure to water in the flux test also could produce further porosity through the unsulfonated layer. Support for this information appears in FIG. 4. Information about the sulfonation-microcraze random maze model appears in *J. Appl. Polym. Sci.*, 9, 1341 (1965), hereby incorporated by reference.

Figure 5:
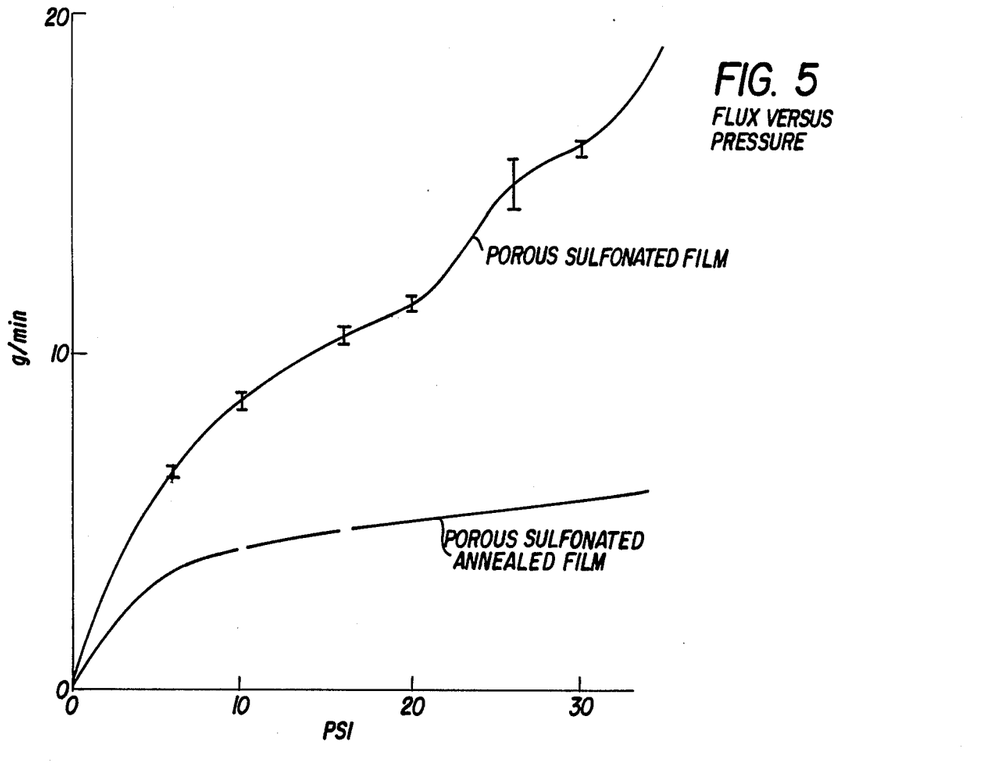
FIG. 5 shows flux versus pressure for a porous sulfonated film having a thickness of 1 mil and sulfonation of 9% and for that film annealed at 80° C. for 43 hours.
Figure 6:
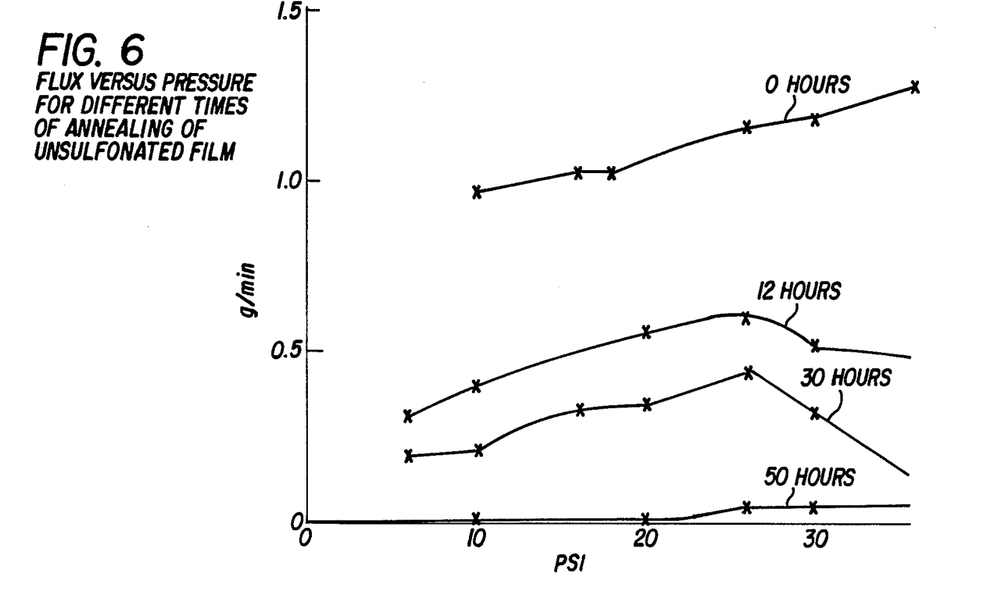
FIG. 6 shows flux versus pressure for different annealing times of an unsulfonated film of 2.4 mil at 80° C.

FIGS. 5 and 6 and Tables 6 and 7, respectively, show the effects of annealing on water flow rates through a sulfonated porous membrane film and an unsulfonated porous membrane film.

TABLE 6
Effect of Annealing on Water Flow Rate

| Pressure, psi | Unannealed Flow Rate g, water/min | Annealed Flow Rate g, water/min |
|---|---|---|
| 0 | — | — |
| 6 | 6.5 | 3.5 |
| 10 | 8.75 | 4.15 |
| 16 | 10.6 | 4.65 |
| 20 | 11.55 | 4.75 |
| 26 | 15.1 | 5.5 |
| 30 | 17.15 | 5.5 |
| 36 | 20.4 | — |

TABLE 7
The Flux vs. Pressure for Different Times of Annealing of Unsulfonated Film

| Pressure, psi | Flow Rate, g, water/min | | | |
|---|---|---|---|---|
| | 0 hr | 12 hrs | 30 hrs | 50 hrs |
| 6 | — | 0.32 | 0.21 | 0 |
| 10 | 0.98 | 0.41 | 0.22 | 0 |
| 16 | 1.04 | — | 0.34 | 0 |
| 20 | 1.04 | 0.57 | 0.35 | 0 |
| 26 | 1.18 | 0.62 | 0.45 | 0.058 |
| 30 | 1.21 | 0.53 | 0.33 | 0.055 |
| 36 | 1.31 | 0.50 | 0.13 | 0.057 |

Annealing is carried out in a conventional manner known to those skilled in the art. In both cases, annealing decreases the flow rate substantially. It appears that annealing may change the relative distribution and pore radii, as well as giving a general decrease in average pore radius with progressive annealing. Annealing of sulfonated porous film with a porous structure penetrating the entire film thickness would produce a coherent membrane with sulfonated, nonporous, domains through the film thickness. These annealed films have considerable flux, as shown in FIG. 5.

Control of porosity recovery may be accomplished by using two different methods for annealing. One method is to anneal the films without holding them under tensile stress, as is done for the films in FIGS. 5 and 6. The porous structure will be heated; the toughness of the film will be largely recovered, but flow rates will decrease, as shown in the Figures.

Another method is to hold the sample under tensile stress while it is being annealed to maintain a given strain. This procedure may allow relaxation of the fibers in the porous structure, while keeping the porosity substantially the same as it was before annealing or some desired smaller size. There would be a corresponding change in flux and selectivity as well as in mechanical properties.

Glassy homopolymers, such as TRYCITE (nominally biaxially oriented polystyrene, trademark of the Dow Chemical Co.), and glassy polyblends, such as STYRON (rubber modified polystyrene, high impact polystyrene, trademark of the Dow Chemical Co.), also can be deformed by the rolling method, but with generally more difficulty than KRO-1. For example, for STYRON polystyrene, the range of effective compression ratio lambda is only from 0.116 to 0.06 to produce rolled membrane extensions in the roll direction of from 3% to 40%. This compares with a lambda range of 0.117 to 0.02 and extensions of 5–97% for KRO-1 samples.

Semicrystalline Membrane Material

The following experiments utilize a high density polyethylene (HDPE) of density 0.96 g/cc and melt index of 7, supplied by the Dow Chemical Co. The sandwiching materials and rolling deformation procedures are the same, as described above, for KRO-1 samples. In all cases, it is visually apparent that porosity density increased with decreasing gap distance of the rollers.

When hard rubber is used as the sandwiching material, under the rolling conditions used, the deformed membrane materials are not permeable to liquid water. However, when the undeformed membrane material is exposed to 10% IGEPAL solution, sandwiched between hard rubber sheets and rolled at lambda=0.598, the deformed membrane is porous to liquid water.

Figure 7:
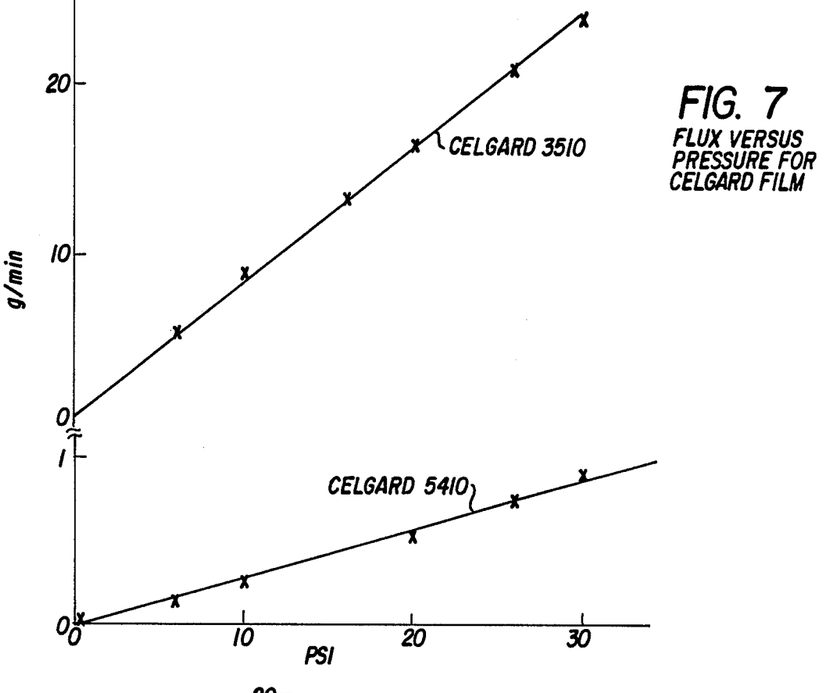
FIG. 7 shows flux versus pressure for isotactic polypropylene films CELGARD 3510 and CELGARD 5410.

Known porous films, such as CELGARD 3501 and 5410 (trademark of Celanese Corporation), have flow rates which increase linearly with pressure, as shown in FIG. 7 and Table 8.

TABLE 8
Flow Rate of CELGARD 3501 and CELGARD 5401

| Pressure, psi | CELGARD 5401 Flow Rate g, water/min | CELGARD 3501 Flow Rate g, water/min |
|---|---|---|
| 0 | 0.015 | 0.15 |
| 6 | 0.14 | 5.32 |
| 10 | 0.25 | 8.85 |
| 16 | — | 13.4 |
| 20 | 0.53 | 16.7 |
| 26 | 0.71 | 21 |
| 30 | 0.88 | 24.3 |
| 36 | 1.08 | — |

Figure 8:
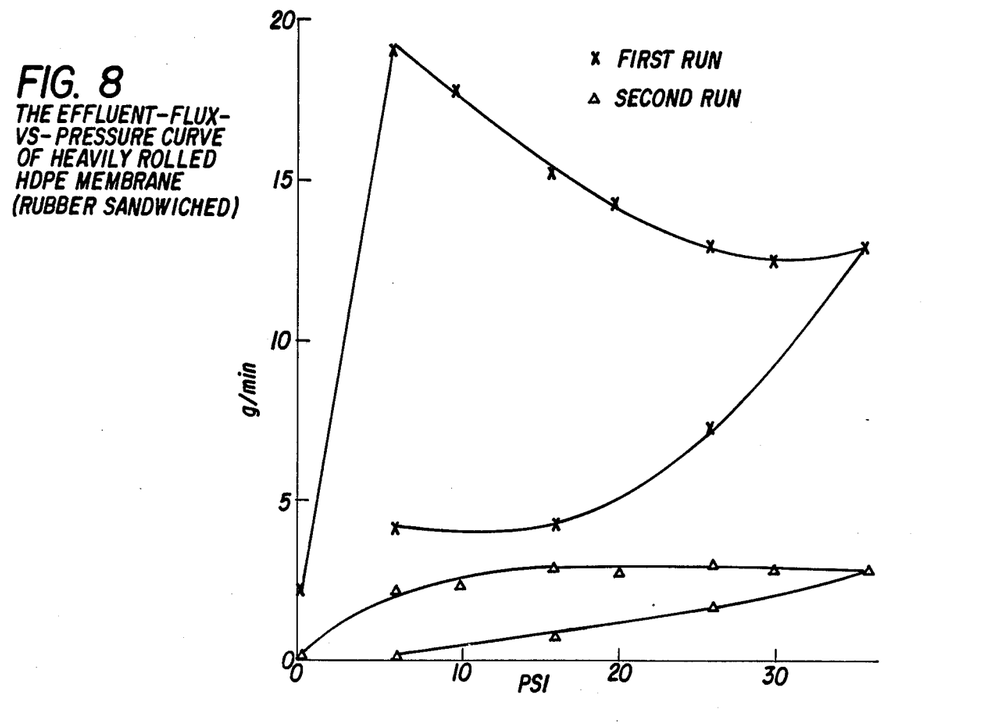
FIG. 8 shows the flux versus pressure curve of rolled high density polyethylene (IGEPAL and hard rubber sandwiched) for two consecutive feed pressure cycles.

In contrast, the flow behavior of some of the present membranes show non-linear features. For porous membranes, the flow rates of unstabilized films usually increase non-linearly with pressure, as shown in FIG. 8 and Table 9, and level off at about 20 psi or even decrease at higher pressures.

TABLE 9
The Effluent-Flux vs. Pressure Curve of Heavily Rolled HDPE Membrane

| Pressure, psi | First Run Flow Rate g, water/min | Second Run Flow Rate g, water/min |
|---|---|---|
| 0 | 2.21 | 0.038 |
| 6 | 19.2 | 2.26 |
| 10 | 17.7 | 2.36 |
| 16 | 15.3 | 2.92 |
| 20 | 14.4 | 2.88 |
| 26 | 13 | 2.99 |
| 30 | 12.45 | 2.78 |
| 36 | 13.1 | 2.81 |
| 26 | 7.2 | 1.65 |
| 16 | 4.15 | 0.75 |
| 6 | 4.35 | 0.19 |

Figure 9:
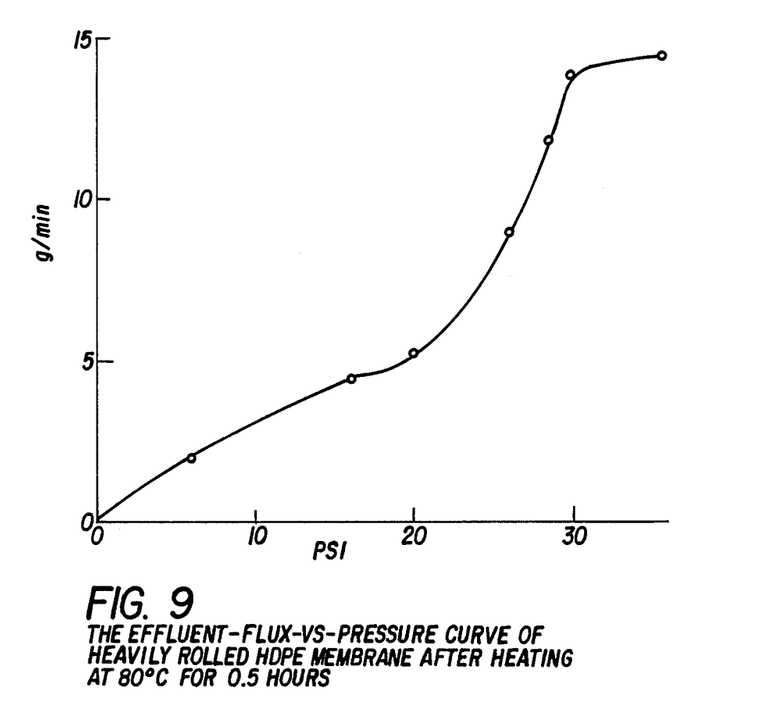
FIG. 9 shows the flux versus pressure curve after heating the sample of FIG. 8 for 30 minutes at 80° C.

It is noted that the flux declines with increasing water feed pressure and as the pressure cycle is repeated. This is ascribed to relaxation of the porous structure with time under increasing hydrostatic pressure. Heating the same sample at 80° C. for 30 minutes produces a porous membrane with a more linear dependence of flux on feed pressure, nearly that of the decreasing pressure curve of FIG. 8, as shown in FIG. 9 and Table 10.

TABLE 10
The Effluent-Flux vs. Pressure Curve of Heavily Rolled HDPE Membrane After Heating at 80° C. for 0.5 Hrs

| Pressure, psi | Flow Rate g, water/min |
|---|---|
| 0 | 0 |
| 6 | 2.08 |

TABLE 10-continued

The Effluent-Flux vs. Pressure Curve of Heavily Rolled HDPE Membrane After Heating at 80° C. for 0.5 Hrs

| Pressure, psi | Flow Rate g, water/min |
|---|---|
| 10 | — |
| 16 | 4.45 |
| 20 | 5.2 |
| 26 | 9 |
| 30 | 14 |
| 36 | 14.4 |

Figure 10:
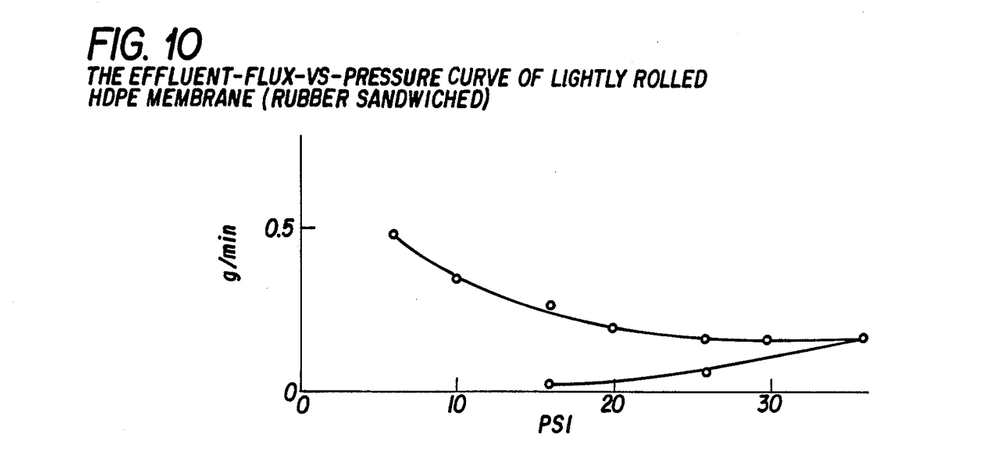
FIG. 10 shows the flux versus pressure curve of high density polyethylene (IGEPAL and hard rubber sandwiched) rolled more lightly (wider roller gap) than that of FIG. 8.

When the sandwiched material is rolled with 10% IGEPAL between hard rubber rollers at lambda=0.68, a wider roller gap, the initial flux versus feed pressure curve is lower than that of the previous experiment, as shown in FIG. 10 and Table 11.

TABLE 11

The Effluent-Flux vs. Pressure Curve of Lightly Rolled HDPE Membrane

| Pressure, psi | Flow Rate g, water/min |
|---|---|
| 0 | 0 |
| 6 | 0.48 |
| 10 | 0.345 |
| 16 | 0.266 |
| 20 | 0.19 |
| 26 | 0.159 |
| 30 | 0.16 |
| 36 | 0.17 |
| 26 | 0.069 |
| 16 | 0.018 |
| 6 | — |

Figure 11:
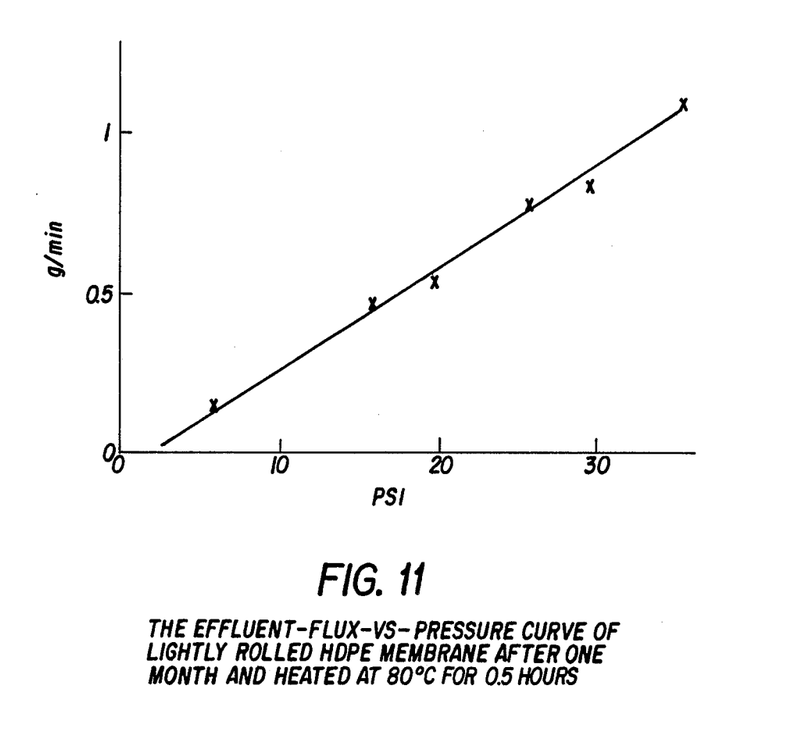
FIG. 11 shows the flux versus pressure curve of the membrane of FIG. 10 after heating for 30 minutes at 80° C.

A comparable decrease in flux with time and feed pressure is observed. After 30 days, the deformed membrane material is heated at 80° C. for 30 minutes. The flux versus feed pressure curve is linear, as shown in FIG. 11 and Table 12, and is the same for increasing and decreasing feed pressures.

TABLE 12

The Effluent-Flux vs. Pressure Curve of Lightly Rolled HDPE Membrane After One Month and Heated at 80° C. for 0.5 Hrs

| Pressure, psi | Flow Rate g, water/min |
|---|---|
| 0 | 0 |
| 6 | 0.13 |
| 10 | — |
| 16 | 0.47 |
| 20 | 0.54 |
| 26 | 0.76 |
| 30 | 0.83 |
| 36 | 0.97 |

When the rolled material is rolled with 10% IGEPAL between polyethylene from sandwiching material at lambda=0.04, the flux is lower for thick membrane materials (1.5 mils) than for thin membrane materials (0.9 mil). At 20 psi feed pressure, the flux is about 0.3 g/min for the 1.5 mil membrane and about 8.0 g/min for the 0.9 mil membrane.

A comparable flux decline with increasing feed pressure and time is again observed. After heating the 0.9 mil sample at 80° C. for 30 minutes, the flux of about 2.0 g/min is nearly independent of feed pressure over the pressure range from 6–20 psi. After standing for 12 hours, the flux over the range decreased to about 0.4 g/min previous flux. After heating again at 80° C. for 2 hours, the flux over the range is about 1.04 g/min. After 12 hours of heating, the flux is about 1.7 g/min at 6 psi, increasing to 1.9 g/min at 16 psi, and then constant to 36 psi at that flux value.

It is not intended to limit the present invention to the specific embodiments described above. It is recognized that other changes may be made in the method and product specifically described herein without deviating from the scope and teachings of the present invention.

I claim:

1. A method for preparing polymer film membranes comprising:
   (a) forming a glassy or semi-crystalline polymer nonporous film membrane having a high surface-to-volume ratio from a homopolymer, copolymer, block copolymer or a poly-blend material; then
   (b) sandwiching the film membrane between yieldable surfaces; and then
   (c) deforming the polymer film membrane by rolling or pressing the sandwiched film to form a poroous film membrane having a high concentration of porous regions per area of matrix;
   whereby fluid flow rate being substantially increased compared to nonporous film membranes.

2. The method according to claim 1, further comprising the polymer being homopolymers of polystyrene, polyacrylate, polycarbonate or polyethylene terephthalate.

3. The method according to claim 2, further comprising the homopolymer being a biaxially oriented polystyrene.

4. The method according to claim 1, further comprising the polymer material being a styrene butadiene copolymer.

5. The method according to claim 1, further comprising the polymer being a high impact polystyrene.

6. The method according to claim 1, further comprising the polymer material being a styrene butadiene block copolymer.

7. The method according to claim 1, further comprising the polymer material being a semicrystalline polymer.

8. The method according to claim 7, further comprising the polymer material being a polyolefin material.

9. The method according to claim 8, further comprising the polymer material being polyethylene, polytetrafluoroethylene or polybutadiene.

10. The method according to claim 1, further comprising chemically modifying the deformed porous polymer film membrane using a solid-fluid heterogeneous reaction.

11. The method according to claim 10, further comprising modifying by sulfonating at least one side of the deformed porous polymer film membrane.

12. The method according to claim 1, further comprising physically modifying the deformed porous polymer film membrane.

13. The method according to claim 10, further comprising physically modifying the chemically modified deformed porous polymer film membrane.

14. The method according to claim 11, further comprising annealing the sulfonated, deformed porous polymer film membrane.

15. The method according to claim 12, further comprising physically modifying by annealing the deformed film membrane.

16. The method according to claim 15, further comprising the annealed film membrane having a thickness of about 0.1–10 mils.

17. The method according to claim 16, further comprising the annealed film membrane having a thickness of about 1–3 mils.

18. The method according to claim 1, further comprising forming the film membrane by casting it on a glass plate using a 6–8% solvent solution.

19. The method according to claim 18, further comprising the solvent being toluene.

20. A method for preparing polymer film membranes comprising:
(a) forming a glassy or semi-crystalline polymer nonporous film membrane having a high surface-to-volume ratio from a homopolymer, copolymer, block copolymer or a poly-blend material; then
(b) sandwiching the film membrane between two sheets of white soft foam or black high modulus rubber; and then
(c) deforming the polymer film membrane by rolling the sandwiched film membrane between yieldable surfaces to form a porous film membrane having a high concentration of porous regions per area of matrix;
whereby fluid flow rate being substantially increased compared to nonporous film membranes.

21. The method according to claim 1, further comprising the yieldable surface being soft rubber, hard rubber or polyethylene foam.

22. The method according to claim 1, further comprising the yieldable surface being polystyrene or aluminum foil.

23. The method according to claim 20, further comprising sandwiching the polymer film membrane between sheets of soft polyethylene foam or black high modulus rubber and then rolling the sandwich.

24. The method according to claim 11, further comprising sulfonating the film membrane by immersing it in a 96–100% sulfonating agent at room temperature for a sufficient time.

25. The method according to claim 24, further comprising the sulfonating agent being sulfuric acid or fuming sulfuric acid.

26. The method according to claim 1, further comprising annealing at least one side of the porous film membrane.

27. The method according to claim 11, further comprising the sulfonation being between 20% and 80%.

28. The method according to claim 11, further comprising the sulfonated, deformed polymer material having specific size and shape charge domains imbedded in an uncharged material matrix.

29. The method according to claim 20, further comprising the two sheets being parallel.

30. The method according to claim 11, further comprising sulfonating the entire thickness of the film.

31. The method according to claim 1, further comprising porous regions being unconnected between surfaces of the polymer membrane.

32. The method according to claim 14, further comprising annealing by heating the deformed film.

33. The method according to claim 14, further comprising annealing by heating the film under tensile stress.

34. The method according to claim 1, further comprising exposing the polymer film membrane to a surface active agent during deformation.

35. The method according to claim 34, further comprising the surface active agent being a non-ionic surfactant.

36. A method for preparing glassy polymer thin film membranes having controlled wide area deforming, comprising:
(a) forming a glassy polymer non-proous film membrane having a high a high surface-to-volume ratio from a homopolymer, copolymer, block copolymer or a polyblend material; then
(b) sandwiching the film membrane between yieldable surfaces; and then
(c) deforming the polymer film membrane by rolling or pressing the sandwiched film to form a porous film membrane having a high concentration of porous regions per area of matrix;
whereby fluid flow rate being substantially increased compared to nonporous film membranes.

37. A method for preparing thin polymer film membranes having controlled wide area deforming, comprising:
(a) forming a thin polymer non-porous film membrane having a high surface-to-volume ratio from glassy polymers, styrene butadiene, block copolymers, polyblends of polystyrene or semicrystalline polymer; then
(b) sandwiching film membrane between yieldable surfaces, then
(c) deforming the glassy or semicrystalline polymer film membrane by rolling or pressing the sandwiched film to form a porous film membrane having a high concentration of porous regions per area of matrix; and
(d) sulfonating the thin, porous polymer film membrane using a solid-fluid heterogeneous reaction;
whereby fluid flow rate being substantially increased compared to nonporous thin film membranes.

38. A method for preparing thin polymer film membranes having controlled wide area deforming, comprising:
(a) forming a thin glassy or semi-crystalline polymer non porous film membrane having a high surface-to-volume ratio from glassy polynmers, styrene butadiene, block copolymers, polyblends of polystyrene or semi-crystalline polymer; then
(b) sandwiching the film membrane between yieldable surfaces, then
(c) deforming the glassy or semicrystalline thin polymer film membrane by rolling or pressing the sandwiched film to form a porous film membrane having a high concentration of porous regions per area of matrix;
(d) sulfonating the thin, porous polymer film membrane using a solid-fluid heterogeneous reaction; and
(e) annealing the sulfonated deformed film membrane;
whereby fluid flow rate being substantially increased compared to nonporous thin film membranes.

39. The method according to claim 1, wherein the yieldable surfaces are elastomeric surfaces.

40. The method according to claim 36, wherein the yieldable surfaces are elastomeric surfaces.

41. The method according to claim 37, wherein the yieldable surfaces are elastomeric surfaces.

42. The method according to claim 38, wherein the yieldable surfaces are elastomeric surfaces.

* * * * *